US012724922B2

(12) United States Patent
Harinath et al.

(10) Patent No.: US 12,724,922 B2
(45) Date of Patent: Sep. 1, 2026

(54) TRUST LAYER FOR LARGE LANGUAGE MODELS

(71) Applicant: Salesforce, Inc., San Francisco, CA (US)

(72) Inventors: Shashank Harinath, Palo Alto, CA (US); Eugene Wayne Becker, Menlo Park, CA (US); Subha Melapalayam, Bellevue, WA (US); Eric Roy Brochu, Vancouver (CA); Na Cheng, Bellevue, WA (US); Mario Sergio Rodriguez, San Francisco, CA (US); Prithvi Krisnan Padmanabhan, San Francsico, CA (US); Kathy Baxter, Palo Alto, CA (US); Kin Fai Kan, Palo Alto, CA (US)

( * ) Notice: Subject to any disclaimer, the term of this patent is extended or adjusted under 35 U.S.C. 154(b) by 142 days.

(21) Appl. No.: 18/410,722

(22) Filed: Jan. 11, 2024

(65) Prior Publication Data

US 2025/0086309 A1 Mar. 13, 2025

Related U.S. Application Data

(60) Provisional application No. 63/537,588, filed on Sep. 11, 2023.

(51) Int. Cl.
*G06F 21/62* (2013.01)
*G06F 40/20* (2020.01)

(52) U.S. Cl.
CPC ...... *G06F 21/6254* (2013.01); *G06F 21/6245* (2013.01); *G06F 40/20* (2020.01)

(58) Field of Classification Search
CPC ...... G06F 21/60; G06F 21/62; G06F 21/6218; G06F 21/6245; G06F 21/6254; G06F 40/20
See application file for complete search history.

(56) References Cited

U.S. PATENT DOCUMENTS 12,147,758 B1 * 11/2024 Thomas .................. G06F 40/18
2006/0143459 A1 * 6/2006 Villaron ............. G06F 21/6254
713/176

(Continued)

FOREIGN PATENT DOCUMENTS

CN 116595977 A 8/2023

OTHER PUBLICATIONS

U.S. Appl. No. 63/508,872, filed May 8, 2023, Lyle; Ruthie D.*

(Continued)

*Primary Examiner* — D'Arcy Winston Straub
(74) *Attorney, Agent, or Firm* — Holland & Hart, LLP.

(57) ABSTRACT

A cloud platform may include a model interface that receives from a client and at an interface for accessing a large language model, a prompt for a response from the large language model, and the client is associated with a set of configuration parameters via a cloud platform that supports the interface. The cloud platform may modify, in accordance with the set of configuration parameters, the prompt that results in a modified prompt and transmit, to the large language model, the modified prompt. The cloud platform may receive the response generated by the large language model and provide the response to a model that determines one or more probabilities that the response contains content from one or more content categories. The cloud platform may transmit the response or the one or more probabilities to the client.

19 Claims, 9 Drawing Sheets

200

(56) References Cited

U.S. PATENT DOCUMENTS

| | | | | |
|---|---|---|---|---|
| 2015/0199537 | A1* | 7/2015 | Dykstra | G06F 21/6227 713/189 |
| 2020/0402625 | A1* | 12/2020 | Aravamudan | G06F 21/6245 |
| 2024/0143916 | A1* | 5/2024 | Lee | G10L 15/22 |
| 2024/0354376 | A1* | 10/2024 | Tandon | G06F 40/20 |
| 2024/0378306 | A1* | 11/2024 | Lyle | G06F 21/6218 |
| 2024/0403560 | A1* | 12/2024 | Radu | G06F 40/284 |
| 2025/0036800 | A1* | 1/2025 | Joshi | G06F 40/20 |

OTHER PUBLICATIONS

Dhinakaran Aparna: "Safeguarding LLMs with Guardrails", Sep. 1, 2023, pp. 1-21.
Gharse Swati: "Introducing Llama 2 on Azure", Jul. 24, 2023, pp. 1-7.
Hillel Adam Cohen: "Introducing Masked-AI, An Open Source Library That Enables the Usage of LLM APIs More Securely", Jun. 1, 2023, pp. 1-11.
ISA/US, "International Search Report and Written Opinion of the International Searching Authority," issued in connection with Int'l Appl. No. PCT/US24/45871, dated Dec. 10, 2024 (10 pages).
Wiggers Kyle: "Microsoft launches new AI tool to moderate text and images", May 23, 2023, pp. 1-7.

* cited by examiner

TRUST LAYER FOR LARGE LANGUAGE MODELS

CROSS REFERENCE

The present Application for Patent claims the benefit of and priority to Provisional Patent Application No. 63/537,588, by Harinath et al., entitled "TRUST LAYER FOR LARGE LANGUAGE MODELS," filed Sep. 11, 2023, assigned to the assignee hereof, and is expressly incorporated by reference in its entirety herein

FIELD OF TECHNOLOGY

The present disclosure relates generally to database systems and data processing, and more specifically to a trust layer for large language models.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

DETAILED DESCRIPTION

Figure 1:
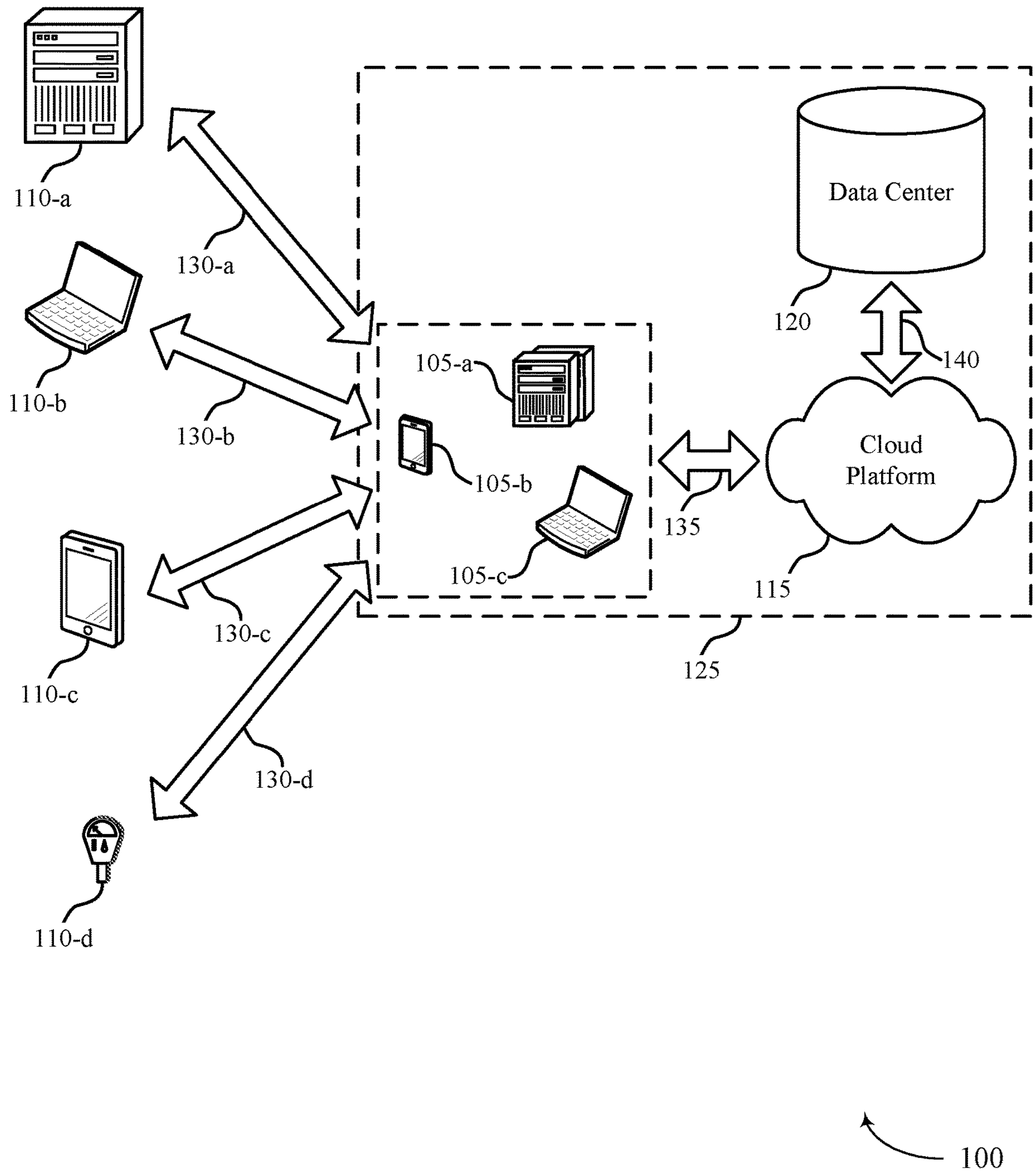
FIG. 1 illustrates an example of a data processing system that supports a trust layer for large language models in accordance with aspects of the present disclosure.

A cloud platform that is accessible by various organizations, tenants, users, and the like may support access to machine learning models to use for various tasks, such as customer relationship management (CRM) related tasks. However, the cloud platform may have access to various types of data, such as sensitive data (e.g., personally identifiable information (PII)) or other tenant data that the tenant does not want ingested by external systems such as a system that supports machine learning models. Further, users that are using a client that is configured for access to a machine learning model may purposefully or inadvertently input such data into a prompt. Finally, the cloud platform may desire to audit responses from machine learning models to determine that the responses do not contain unsafe content, such toxic content.

Techniques described herein address the foregoing by providing a model interface that is used to moderate content intended for input into a machine learning model, such as a large language model (LLM), and moderate content generated by the machine learning model. The model interface may perform various techniques to moderate content. For example, the model interface may be configured to process a prompt received from a client to identify elements of sensitive information, such as PII. The interface may mask the elements of sensitive information by inserting masking elements (e.g., tags) into the prompt before providing the prompt to the model. If the model provides a response that includes the masking elements, then the model interface may replace the masking elements with the elements of sensitive information such that the response includes the input elements. Accordingly, in cases where the model is external to the cloud platform, the model interface may prevent sensitive or unauthorized data from being processed by the model while also providing a meaningful response that includes the input data. The model interface may also perform techniques to defend against adversarial prompts. Such techniques may include instruction defense, post-prompting, prompt enclosure, prompt filtering, length restrictions, or a combination thereof.

Additionally, the client provided prompt, the model provided response, or both may be provided to a separate model or service to determine whether the prompts or responses contain undesirable content, such as toxic content. The model may provide probability metrics that are indicative of whether the prompt or response contains content from one or more content categories, such as toxicity, hate, identity, violence, physical, sexual, and profanity categories. If one or more of the probabilities satisfy a threshold, then the model generated response may not be provided to the client, the response may be modified, and/or the client may be notified that the response contains content from one or more categories. Additionally, the content moderation (e.g., moderation of prompts or responses) may be dependent on one or more configuration parameters that are associated with the platform, the client, or both. These and other techniques are described in further detail with respect to the figures.

Aspects of the disclosure are initially described in the context of an environment supporting an on-demand database service. Aspects of the disclosure are further described with a computing environment illustrating prompt and content modification, a configuration level diagram, and a process flow diagram. Aspects of the disclosure are further illustrated by and described with reference to apparatus diagrams, system diagrams, and flowcharts that relate to a trust layer for large language models.

FIG. 1 illustrates an example of a system 100 for cloud computing that supports a trust layer for large language models in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

The cloud platform 115 may support access to one or more machine learning models by the cloud clients 105. For example, the cloud clients 105 may develop or support computing clients that are configured to access the model supported by the cloud platform 115. Additionally, or alternatively, the cloud clients 105 may develop the computing client using facilities provided by the cloud platform 115. The models may be configured to access data within the data center 120 or other data sources. The computing clients may be accessible by contacts 110, which may be users or customers associated with the cloud clients 105. In some examples, the computing clients and the models may be configured to support various tasks associated with the cloud clients 105, such as CRM tasks including customer support, content generation or management, customer feedback, data analysis, or the like.

However, the cloud clients 105, the cloud platform 115, users (e.g., contacts 110), or the like may want to access these machine learning models (LLMs) while maintaining data privacy, security, residency, and compliance goals. For example, the cloud platform 115 may interface with a third party LLM service, and the cloud clients 105 may seek prevention of client data from being ingested by the third party LLM service. Additionally, the cloud clients 105 may desire that services accessible by customers or users maintain domain specific content goals, such as mitigation of unsafe content (e.g., content that includes toxic or biased responses). Some content moderation techniques may rely on user input, and may be subject to bias and errors. Additionally, users may not be aware of when prompts or responses include client specific data. Finally, automated techniques that remove content from prompts or responses may remove content in a manner such that any meaning is removed, thereby rendering the use of models moot or ineffective.

Techniques described herein address the foregoing by providing a model interface that performs content moderation based on configurations provided by the cloud platform 115, the cloud clients 105, or a combination thereof. In some examples, the model interface is referred to as a "trust layer," in that it performs content moderation between a user/client and a model and vice versa (e.g., between the model and the user/client). For example, the cloud platform 115 may be configured to interface with one or more third party LLM services to provide LLM services to cloud clients 105. The model interface that is accessed by cloud clients 105 may implement the content moderation techniques described herein to moderate prompts provided to the third party services and to moderate responses provided by the third party LLM services. Additionally, the content moderation techniques are customizable in accordance with configuration parameters, such that cloud clients have the ability to configure which content is filtered, removed, masked, etc. and which content is allowed to pass to the model and the client (e.g., based on safety thresholds). Accordingly, the techniques described herein support reliable, safe, and secure access to LLMs by cloud clients 105 and corresponding contacts 110. Aspects of the present disclosure are described with respect to techniques for content moderation associated with access to a model that is a LLM model, but it should be understood that the techniques described herein may be used with respect to access to other types of machine learning models.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
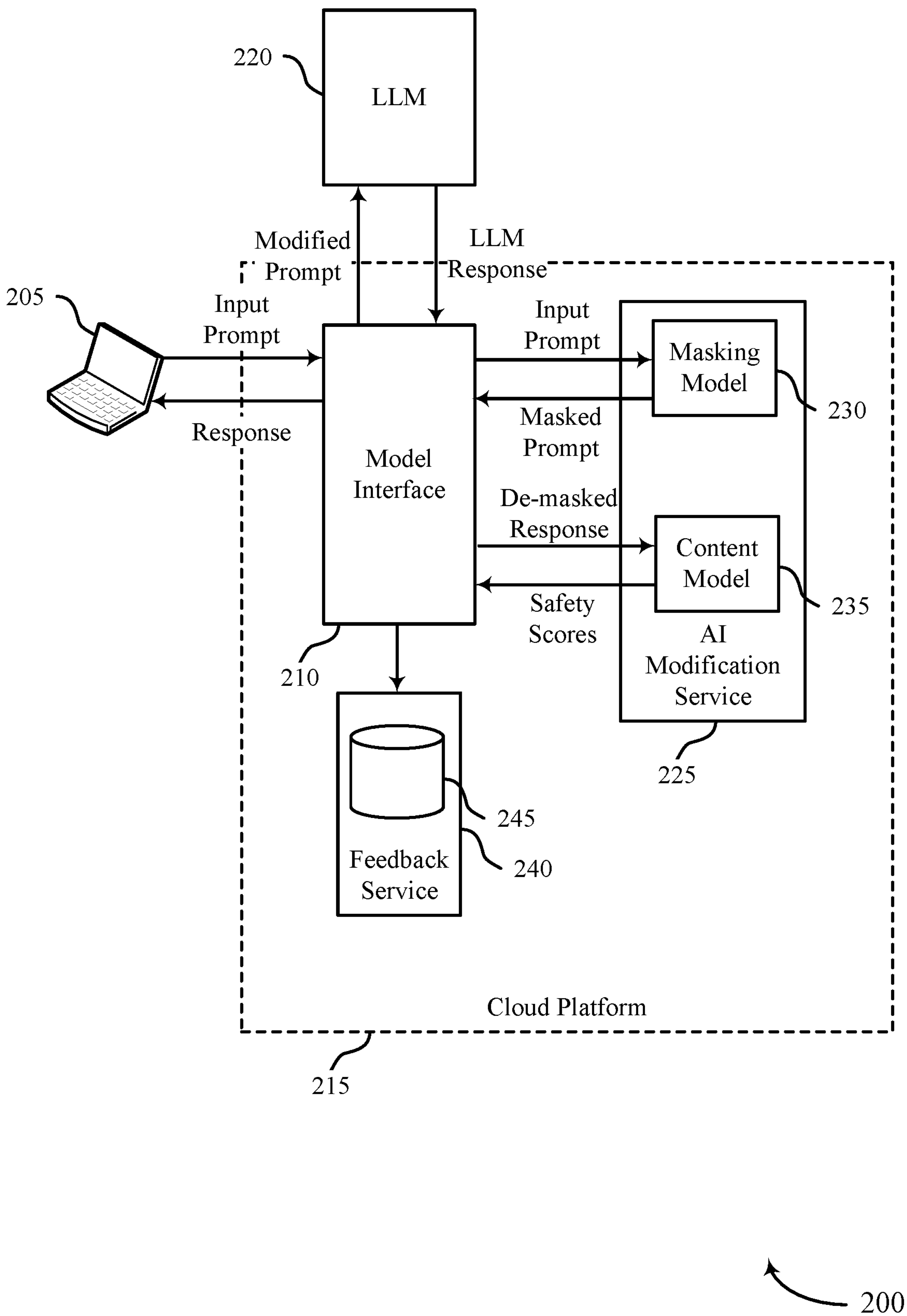
FIG. 2 shows an example of a computing environment that supports a trust layer for large language models in accordance with aspects of the present disclosure.

FIG. 2 shows an example of a computing environment 200 that supports a trust layer for large language models in accordance with aspects of the present disclosure. The computing environment 200 includes a client 205, a cloud platform 215, and a LLM 220, which may be examples of aspects of FIG. 1. For example, the client 205 may be an example of a cloud client 105 or contact 110 of FIG. 1 and the cloud platform 215 may be an example of aspects of the subsystem 125 of FIG. 1, such as the cloud platform 115. The client 205 may represent an application (e.g., a generative AI application or service that is configured to access generative AI services) that is accessible by users, such as a user associated with a cloud client 105 including employees or customers (e.g., contacts 110). Aspects of the application may be hosted by the cloud platform 215. In some cases, one or more users may configure the application using aspects of the cloud platform 215, and the application may be configured for performing various tasks, such as CRM related tasks described herein, for the cloud client 105, using generative AI.

The cloud platform 215 hosts various services for providing access to the LLM 220 by clients, such as the client 205. The cloud platform 215 may also host various other services, including CRM related services as described with respect to FIG. 1. As described herein, the cloud platform 215 may host services for content moderation for interfacing with the LLM 220. The LLM 220 may be an externally hosted LLM, such as a third party LLM hosted on servers separate from the servers that host the cloud platform 215. Additionally, or alternatively, the LLM may be hosted on servers associated with the cloud platform 215. In such cases, the cloud platform 215 may be configured to support a bring your own model (BYOM) approach, whereby clients can upload or configure a custom LLM at the cloud platform 215. As described herein, the cloud platform 215 hosts services and performs techniques for supporting data privacy, security, and content safety in LLM access. Whether cloud clients configure their own models or use a model configured with or supported by the cloud platform 215, the trust layer may be embedded with and used with other components of the cloud platform 215, such as various services supported by the cloud platform 215 including CRM services, communication services, and the like.

The cloud platform 215 may include a model interface 210, which receives or obtains input prompts from various applications, including the client 205. For example, the model interface 210 receives the input prompt from the client 205. The model interface 210) may be configured to facilitate various aspects of content moderation for LLM interaction as described herein. Additionally, the content moderation may be performed in accordance with configuration parameters. The configuration parameters may be associated with or configured in association with aspects of the cloud platform 215. In some cases, the client (e.g., cloud client 105) may configure the configuration parameters. More particularly, as the cloud platform 215 may host various different cloud clients 105 (e.g., tenants), each cloud client 105 may have a different and respective set of configuration parameters that are indicative of how the cloud platform 215 is to perform content moderation for LLM interaction.

In some cases, after receiving the input prompt, the model interface may provide the input prompt to an AI modification service 225, which hosts various services for content moderation, such as a masking model 230. The masking model 230 may be configured to modify the input prompt to generate a modified input prompt. For example, the masking model 230 may be configured to process the input prompt, determine that the input prompt contains one or more elements of sensitive information, and replace the elements of sensitive information with masking elements. Sensitive information may include PII, PCI information, PHI, and/or information flagged by the cloud client 105 (e.g., the configuration parameters associated with the cloud client 105) as being sensitive or restricted. The masking model 230 may be configured to implement various techniques to identify the elements for sensitive information, such as named entity recognition (NER) techniques, regular expressions (regex), and other information extraction or identification techniques. Additionally, as the cloud platform 215 may host or access various types of data associated with a cloud client 105, the cloud client 105 may flag various data objects (e.g., data tables) and/or fields (e.g., columns) of data objects as being restricted or sensitive. That is, the multi-tenant system may have a set of data tables or objects that may be accessed using facilities of the cloud client 105. However, one or more of the tables or fields may be restricted from being accessible by the LLM. The flagging of such information may be an example of the configuration parameters that are used for prompt modification as described herein. In such cases, the masking model 230 may access information that indicates that the objects and/or fields are flagged and identify such corresponding information in the input prompt and mask the information as described herein.

Thus, after identifying the elements of sensitive information in the input prompt, the masking model 230 may replace the elements with masking elements. The masking elements may be indicative of the type of sensitive information. For example, if an input prompt includes a name of a first person and a name of a second person, then these names may be replaced with the masking elements <PERSON_0> and <PERSON_1> respectively. Similarly, if the input prompt includes a credit card number, then the masking model 230 may replace the credit card number with the masking element <CREDIT_CARD_0>. The masking model 230) or an associated service may maintain a mapping of masking elements to sensitive elements for de-masking, as described in further detail herein. Information that is masked may include financial information, full names, contact information, government issued identification numbers, login credentials, objects, fields, and the like.

The AI modification service 225 may also perform various other techniques for modifying the input prompt. For example, the AI modification service 225 may implement techniques for prompt defense to prevent adversarial prompt injection attacks. Adversarial prompt injection attacks are a threat vector for generative AI services. By inserting clever phrases in a prompt, it is possible to create a malicious input that makes a language model change its expected behavior. These inputs can bypass filters or manipulate the LLM using carefully crafted prompts that make the model ignore other instructions, perform unintended actions, or access restricted resources through code injection. Thus, the AI modification service 225 may employ various heuristic approaches for defending prompts, such as instruction defense, post-prompting, prompt enclosure, prompt filtering, and prompt length restrictions. For instruction defense, the AI modification service 225 may instruct the model (by inserting additional instructions in the prompt) to be careful about what comes next in the prompt. For post-prompting, the AI modification service 225 may insert user input toward the beginning of the prompt, as LLMs may often follow the last instructions that the model processes. For prompt enclosure, the AI modification service 225 may sandwich or enclose the input prompt within two prompts, within a random sequence of characters, or within XML tags so that the model is limited from referencing other elements in the prompt such that the prompt is tightly controlled. Thus, the AI modification service 225 may insert sets of characters (e.g., random characters. XML tags, other prompt strings) before and/or after the input prompt. Prompt filtering may include identification and deletion of specific words or phrases (e.g., as included in a reference data store) before the prompt is provided to the LLM. Length restrictions may control the length of the input prompt that may prevent attack prompts and virtualization attacks. Thus, the AI modification service 225 may implement various prompt defense techniques, which allows the service to integrate defensive prompt text seamlessly (e.g., using a "raw content" field that acts as a protective layer around user-defined prompt instructions). A "prompt prefix" is used within the raw content field to emphasize caution and a "prompt suffix" as the final directive to the LLM for added security. Other prompt defense techniques are contemplated within the context of the present disclosure.

After the input prompt is modified by the AI modification service 225 to generate the modified prompt (e.g., a masked prompt), the model interface 210 may transmit the modified prompt to, or otherwise provide the prompt to, the LLM 220. Transmission of the modified prompt may include calling an application programming interface (API) endpoint associated with the LLM. The API request may include additional information or instructions for the LLM 220, such as instructions to not store the information included in the prompt, response formatting instructions, or the like. The LLM 220, in response to the modified prompt, may provide a LLM response that is generated by the LLM 220.

The LLM response, which is provided to the model interface 210, may be further processed for content moderation. For example, the LLM response may be provided to the masking model 230 such that the response may be de-masked. That is, the response may include the masking elements that were provided in the modified prompt. As such, to provide a meaningful response, the masking model 230 may use the mapping of sensitive elements to masking elements to de-mask the response by replacing the masking elements with the elements of sensitive information. Thus, if the response includes the masking element <PERSON_1>, then the <PERSON_1> masking element is replaced with the name mapped to the <PERSON_1> masking element (as mapped by the masking model 230 for the input prompt).

The de-masked prompt may be provided to a content model 235 of the AI modification service 225 for determining whether the response includes content from one or more content categories. For example, the content model 235 may process the response and generate probabilities that the response contains content from one or more categories. The one or more categories may include content categories that correspond to content that is deemed unsafe, derogatory, toxic or the like. The content categories may include toxicity, hate, identity, violence, physical, sexual, profanity, or a combination thereof. In some cases, probabilities for each category or an overall probability may be analyzed with reference to a threshold. For example, if one or more of the probabilities satisfy the threshold, then the response may be modified and/or the model interface 210 may refrain from transmitting the response to the client 205. In other cases, the AI modification service 225 may indicate, to the client 205, that the generated response includes content from one or more categories. This indication may be transmitted with the response or instead of the response.

Thus, given an input text, the content model 235 may output an overall safety score from 0 (least safe) to 1 (most safe). The content model 235 may also output several category sub-scores representing the probability that the text contains toxic, hateful, violent, sexual, identity, physical or profanity content. Further, score thresholds may be set to determine appropriate remediation actions depending on the use case. Thus, different thresholds and different remediation actions may be configured based on a use case and/or cloud client 105, and different cloud clients 105 (and use cases within a cloud client 105) may have different thresholds and remediation actions. Thus, the thresholds and actions may be examples of configuration parameters that are used by the cloud platform 215 for content moderation.

In some examples, the AI modification service 225 may include functionality that is used to detect bias, inclusion of copyrighted work, or the like. Additionally, the AI modification service 225 may process the response to determine accuracy and relevance based on the prompt. In some cases, a second call to the LLM 220 may be used to verify the initial response. Additionally, the cloud platform 215 may implement techniques to automate validation of responses against existing data (e.g., CRM data) or client supplied reference data.

As described herein, the cloud platform 215, the LLM 220, or both may implement a zero data retention policy. In some cases, the LLM 220 may check whether the API request includes a source identifier associated with a source that requests zero data retention. For example, for API user traffic, the LLM 220 platform logic checks if prompts are being sent from a particular identifier, and if this condition is met, the prompts are not sent to downstream storage locations. Additionally, as noted herein, cloud clients may provide their own LLM models. In such cases, the cloud platform 215 may host cloud client LLM endpoints via the model interface 210, and these trust layer techniques are made available via these endpoints.

Additionally, the model interface 210 may facilitate techniques for providing an audit trail for transparency and control. For example, the audit trail may capture the following fields for generations: request identifier, timestamp, prompts, generated content/responses, safety scores (e.g., probability scores), customer feedback, and the like. For example, the response and the corresponding information may be provided to a feedback service 240, which stores the information in one or more data stores 245, which may be an example of aspects of the data center 120 as described with respect to FIG. 1.

Further, the cloud platform 215 may provide transparency through dashboard and alerting. Safety scores and toxicity scores on prompts and their outputs may be aggregated and made available via a dashboard to provide transparency to cloud clients. Cloud clients may also have the ability to drill down to the details of any record and review details, invoke actions to deactivate the prompt, adjust the prompt etc. The cloud client may set up alert measures on the dashboard. The alerting system may notify customers if any prompts contain malicious inputs or toxic outputs, allowing them to invoke swift action and prevent any potential harm.

As described herein, various aspects of content moderation may be configurable. The cloud clients, users, customers, etc. may configure various aspects of the trust layer as described herein. In some cases, users may configure aspects of the configuration parameters. For example, users may configure types of sensitive information to be masked, configure thresholds for safety/toxicity scores of input prompts, thresholds for safety/toxicity scores of generated response, etc. Further, the cloud clients may proactively block prompts from reaching the LLM 220 based on specific toxicity, sensitive information, safety criteria, etc.

Figure 3:
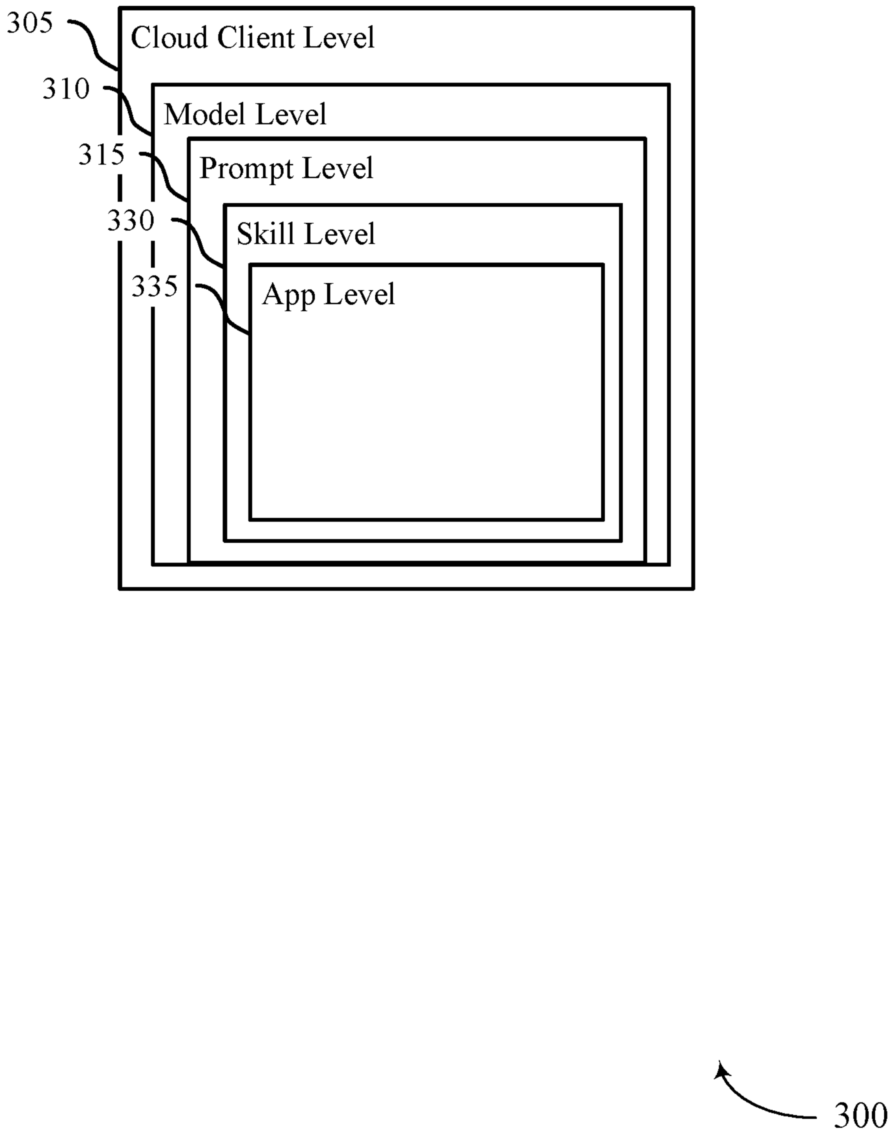
FIG. 3 shows an example of configurability levels that support a trust layer for large language models in accordance with aspects of the present disclosure.

FIG. 3 shows an example of configurability levels 300 that support a trust layer for large language models in accordance with aspects of the present disclosure. The configurability levels 300 may be implemented or enforced by a cloud platform as described with respect to FIGS. 1 and 2. The configurability levels 300 include a cloud client level 305, a model level 310, a prompt level 315, a skill level 330, and an application level 335. The cloud client level 305 may correspond to configuration parameters of an organization, tenant, etc. Model level 310 configurability may be dependent on the LLM model that is used for the different use cases, whether it be a BYOM model, a 3rd party model, or the like. Thus, an organization may have different configurations for different models. Further, the prompt level 315 configurability may correspond to configurations for different prompts. Thus, a first set of parameters may be enforced for a first prompt or prompt type, and a second set of configuration parameters may be enforced for a second prompt or prompt type. The application level 335 configuration parameter set may be applied based on the application that is used to access the cloud platform and/or the LLM. Further, the control layer that enforces these configurations may be accessible by different personas, such as an administrator, a data specialist, and a prompt engineer.

Figure 4:
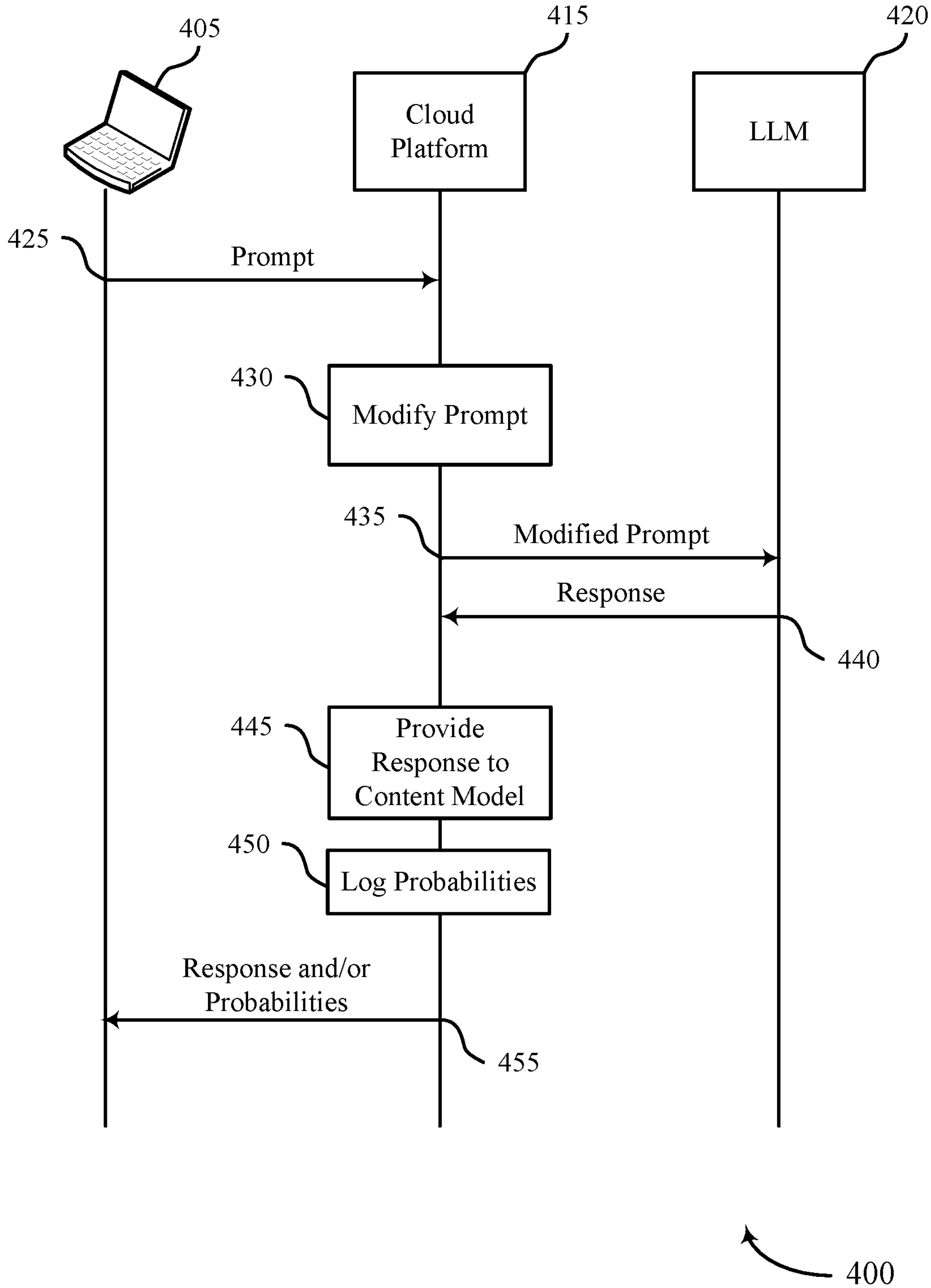
FIG. 4 shows an example of a process flow that supports a trust layer for large language models in accordance with aspects of the present disclosure.

FIG. 4 shows an example of a process flow 400 that supports a trust layer for large language models in accordance with aspects of the present disclosure. The process flow 400 includes a client 405, a cloud platform 415, and an LLM 420, which may be examples of the corresponding devices and systems as described with respect to FIGS. 1 through 3.

At 425, a model interface of the cloud platform receives, from the client 405, a prompt for a response from the LLM 420. The client 405 may be associated with a set of configuration parameters via the cloud platform 415 that supports the model interface. For example, the cloud platform 415 may be configured with a set of configuration parameters that are to be applied to prompts received from the client 405 based on a cloud client (e.g., organization) configuration, client configuration, or other configuration as described with respect to FIGS. 2 and 3.

At 430, the cloud platform 415 may modify, in accordance with the set of configuration parameters, the prompt that results in a modified prompt. Modifying the prompt may include determining that the prompt includes one or more elements of sensitive information and replacing the one or more elements of sensitive information with one or more respective masking elements. The one or more elements of sensitive information may include PII, PCI information, PHI, or a combination thereof. The elements of sensitive information may additionally or alternatively include information that is flagged to be masked in accordance with the set of configuration parameters. Modifying the prompt may include inserting a first set of characters prior to the prompt to generate the modified prompt, inserting a second set of characters after the prompt to generate the modified prompt, or inserting the first set of characters prior to the prompt and inserting the second set of characters after the prompt to generate the modified prompt. These character insertions may be examples of deterministic defense techniques such as instruction defense, post-prompting, or prompt filtering. The first set of characters, the second set of characters, or both may include a random sequence of characters, a set of XML tags, or a combination thereof. Modifying the prompt may also include deleting one or more elements of the prompt to generate the modified prompt such as to perform prompt filtering.

At 435, the cloud platform 415 may transmit, to the LLM 420 via a model interface, the modified prompt. The model interface may be an API.

At 440, the cloud platform 415 may receive, via the model interface, the response to the modified prompt. The response is generated by the LLM 420.

At 445, the cloud platform 415 may provide the response to a model that determines one or more probabilities that the response contains content from one or more content categories. The model may be example of the content model 235 as described with respect to FIG. 2.

At 450, the cloud platform 415 may log the one or more probabilities in association with the response, the prompt or both. The probabilities may be logged such as to provide evaluation of the performance of the model and the content modification techniques. The cloud platform 415 may also log any user feedback based on the response. The probabilities may also be accessible by a dashboard, as described herein At 455, the cloud platform 415 may transmit, to the client 405 based at least in part on the one or more probabilities, the response, an indication of the one or more probabilities, or both. For example, if the one or more probabilities are above a threshold, then the cloud platform 415 may indicate to the client 405 that the response contains unsafe or toxic content. If the one or more probabilities are below the threshold, then the cloud platform 415 may return the response without an indication of the probabilities.

Figure 5:
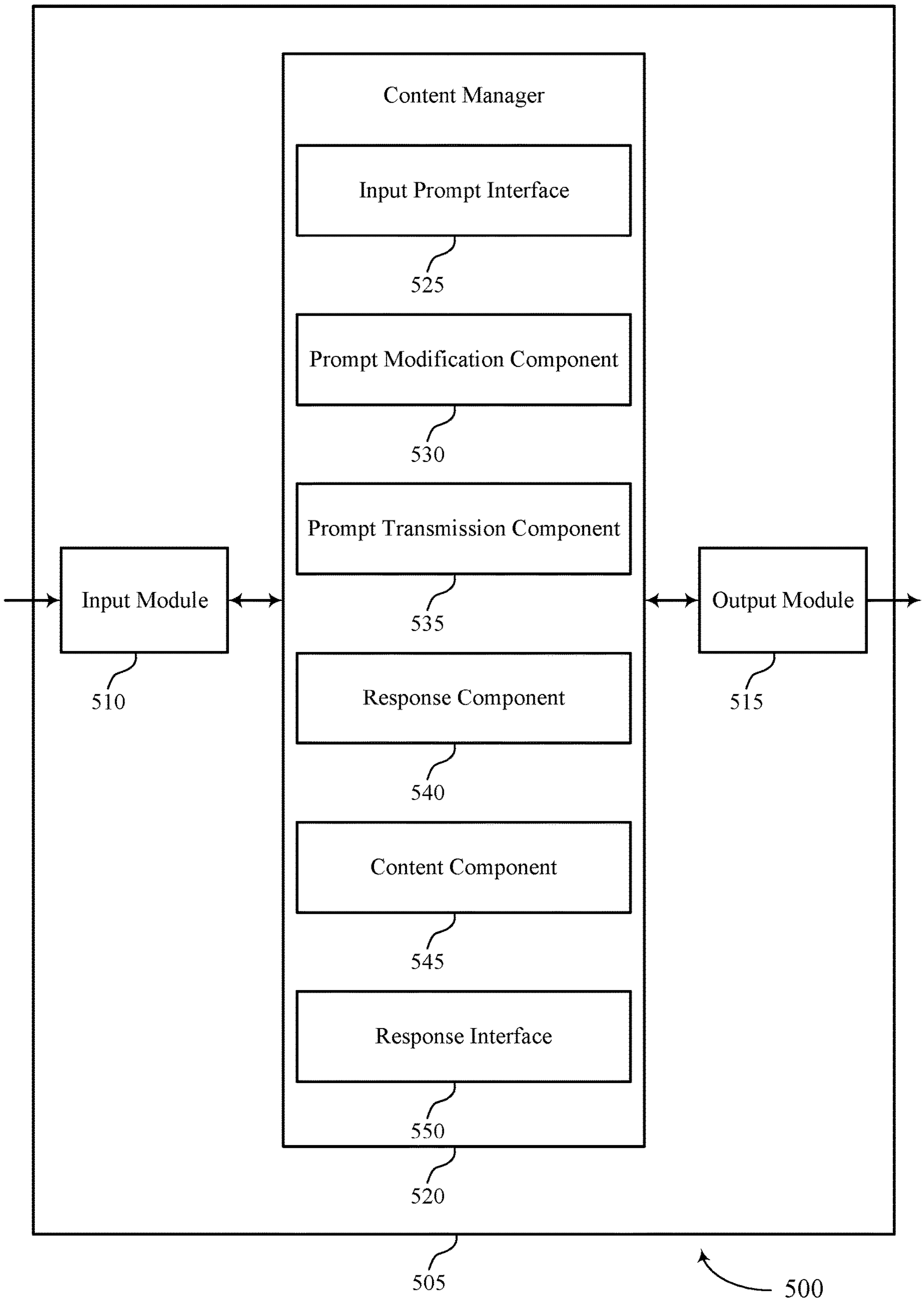
FIG. 5 shows a block diagram of an apparatus that supports a trust layer for large language models in accordance with aspects of the present disclosure.

FIG. 5 shows a block diagram 500 of a device 505 that supports a trust layer for large language models in accordance with aspects of the present disclosure. The device 505 may include an input module 510, an output module 515, and a content manager 520. The device 505, or one or more components of the device 505 (e.g., the input module 510, the output module 515, and the content manager 520), may include at least one processor, which may be coupled with at least one memory, to support the described techniques. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the content manager 520 to support a trust layer for large language models. In some cases, the input module 510 may be a component of an input/output (I/O) controller 710 as described with reference to FIG. 7.

The output module 515 may manage output signals for the device 505. For example, the output module 515 may receive signals from other components of the device 505, such as the content manager 520, and may transmit these signals to other components or devices. In some examples, the output module 515 may transmit output signals for display in a user interface, for storage in a database or data store, for further processing at a server or server cluster, or for any other processes at any quantity of devices or systems. In some cases, the output module 515 may be a component of an I/O controller 710 as described with reference to FIG. 7.

For example, the content manager 520 may include an input prompt interface 525, a prompt modification component 530, a prompt transmission component 535, a response component 540, a content component 545, a response interface 550, or any combination thereof. In some examples, the content manager 520, or various components thereof, may be configured to perform various operations (e.g., receiving, monitoring, transmitting) using or otherwise in cooperation with the input module 510, the output module 515, or both. For example, the content manager 520 may receive information from the input module 510, send information to the output module 515, or be integrated in combination with the input module 510, the output module 515, or both to receive information, transmit information, or perform various other operations as described herein.

The content manager 520 may support data processing in accordance with examples as disclosed herein. The input prompt interface 525 may be configured for receiving, from a client and at an interface for accessing a large language model, a prompt for a response from the large language model, where the client is associated with a set of configuration parameters via a cloud platform that supports the interface. The prompt modification component 530 may be configured for modifying, in accordance with the set of configuration parameters, the prompt that results in a modified prompt. The prompt transmission component 535 may be configured to transmit, to the large language model via a model interface, the modified prompt. The response component 540 may be configured to receive, via the model interface, the response to the modified prompt, where the response is generated by the large language model. The content component 545 may be configured to provide the response to a model that determines one or more probabilities that the response contains content from one or more content categories. The response interface 550 may be configured for transmitting, to the client and based on the one or more probabilities, the response, an indication of the one or more probabilities, or a combination thereof.

Figure 6:
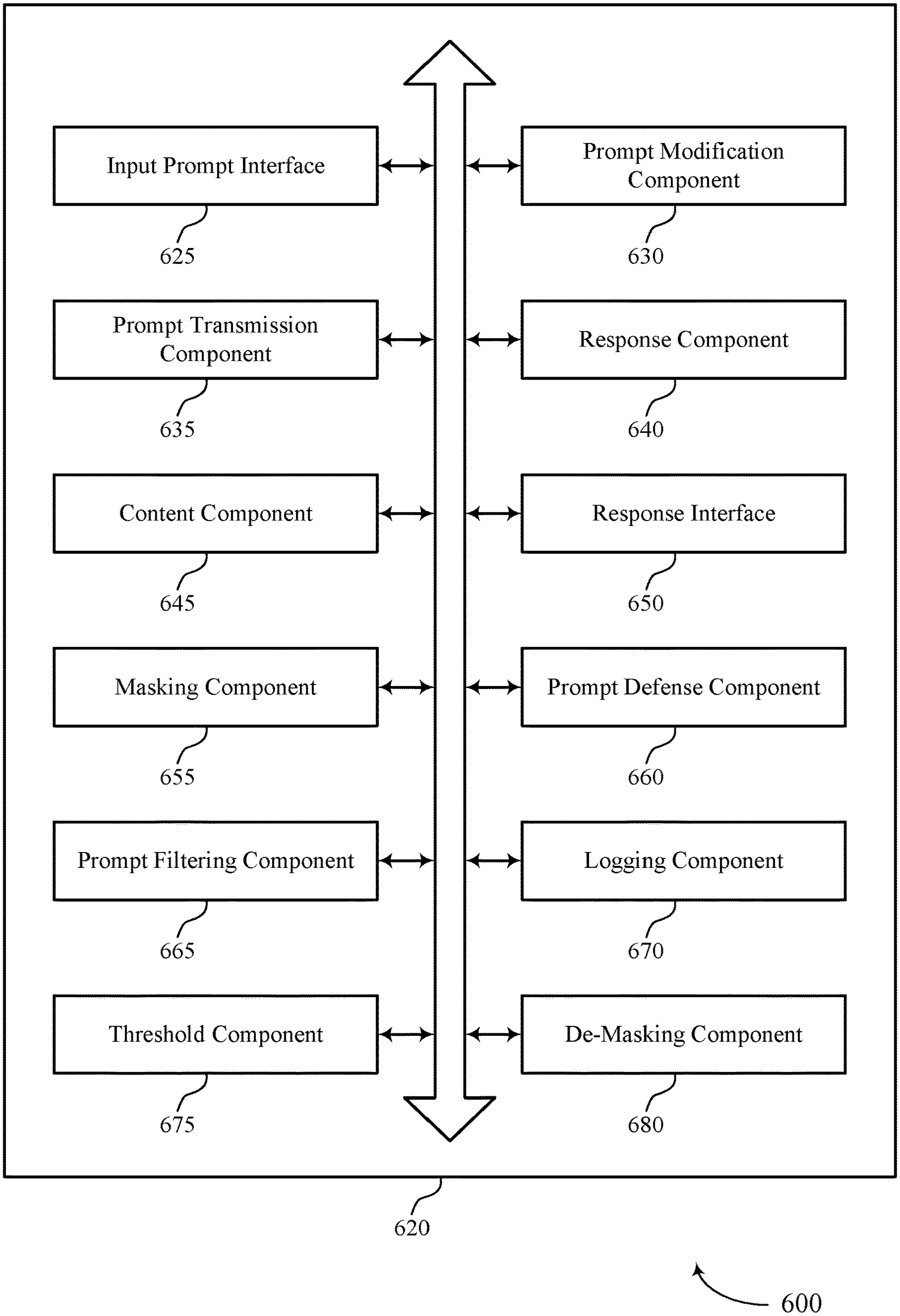
FIG. 6 shows a block diagram of a content manager that supports a trust layer for large language models in accordance with aspects of the present disclosure.

FIG. 6 shows a block diagram 600 of a content manager 620 that supports a trust layer for large language models in accordance with aspects of the present disclosure. The content manager 620 may be an example of aspects of a content manager or a content manager 520, or both, as described herein. The content manager 620, or various components thereof, may be an example of means for performing various aspects of a trust layer for large language models as described herein. For example, the content manager 620 may include an input prompt interface 625, a prompt modification component 630, a prompt transmission component 635, a response component 640, a content component 645, a response interface 650, a masking component 655, a prompt defense component 660, a prompt filtering component 665, a logging component 670, a threshold component 675, a de-masking component 680, or any combination thereof. Each of these components, or components of subcomponents thereof (e.g., one or more processors, one or more memories), may communicate, directly or indirectly, with one another (e.g., via one or more buses).

The content manager 620 may support data processing in accordance with examples as disclosed herein. The input prompt interface 625 may be configured for receiving, from a client and at an interface for accessing a large language model, a prompt for a response from the large language model, where the client is associated with a set of configuration parameters via a cloud platform that supports the interface. The prompt modification component 630 may be configured for modifying, in accordance with the set of configuration parameters, the prompt that results in a modified prompt. The prompt transmission component 635 may be configured for transmitting, to the large language model via a model interface, the modified prompt. The response component 640 may be configured for receiving, via the model interface, the response to the modified prompt, where the response is generated by the large language model. The content component 645 may be configured to provide the response to a model that determines one or more probabilities that the response contains content from one or more content categories. The response interface 650 may be configured for transmitting, to the client and based on the one or more probabilities, the response, an indication of the one or more probabilities, or a combination thereof.

In some examples, to support modifying the prompt, the masking component 655 may be configured for determining that the prompt includes one or more elements of sensitive information. In some examples, to support modifying the prompt, the masking component 655 may be configured for replacing the one or more elements of sensitive information with one or more respective masking elements.

In some examples, the de-masking component 680 may be configured for identifying that the response generated by the large language model includes the one or more respective masking elements. In some examples, the de-masking component 680 may be configured for replacing the one or more respective masking elements in the response with respective elements of the one or more elements of sensitive information, where the response that includes the one or more elements of sensitive information is transmitted to the client.

In some examples, the one or more elements of sensitive information include personally identifiable information (PII), payment card industry (PCI) information, protected health information (PHI), or a combination thereof.

In some examples, the one or more elements of sensitive information include information that is flagged to be masked in accordance with the set of configuration parameters.

In some examples, to support modifying the prompt, the prompt defense component 660 may be configured for inserting a first set of characters prior to the prompt to generate the modified prompt. In some examples, to support modifying the prompt, the prompt defense component 660 may be configured for inserting a second set of characters after the prompt to generate the modified prompt. In some examples, to support modifying the prompt, the prompt defense component 660 may be configured for inserting the first set of characters prior to the prompt and inserting the second set of characters after the prompt to generate the modified prompt.

In some examples, the first set of characters, the second set of characters, or both include a random sequence of characters, a set of Extensible Markup Language (XML) tags, or a combination thereof.

In some examples, to support modifying the prompt, the prompt filtering component 665 may be configured for deleting one or more elements of the prompt to generate the modified prompt.

In some examples, the logging component 670 may be configured for logging the one or more probabilities in association with the prompt, the response, or both.

In some examples, the threshold component 675 may be configured for determining whether the one or more probabilities satisfy a threshold, where the response, the indication of the one or more probabilities, or both are transmitted to the client based on whether the one or more probabilities satisfy the threshold.

In some examples, the threshold component 675 may be configured for obtaining the threshold from the set of configuration parameters.

In some examples, the one or more content categories include toxicity, hate, identity, violence, physical, sexual, profanity, or a combination thereof.

Figure 7:
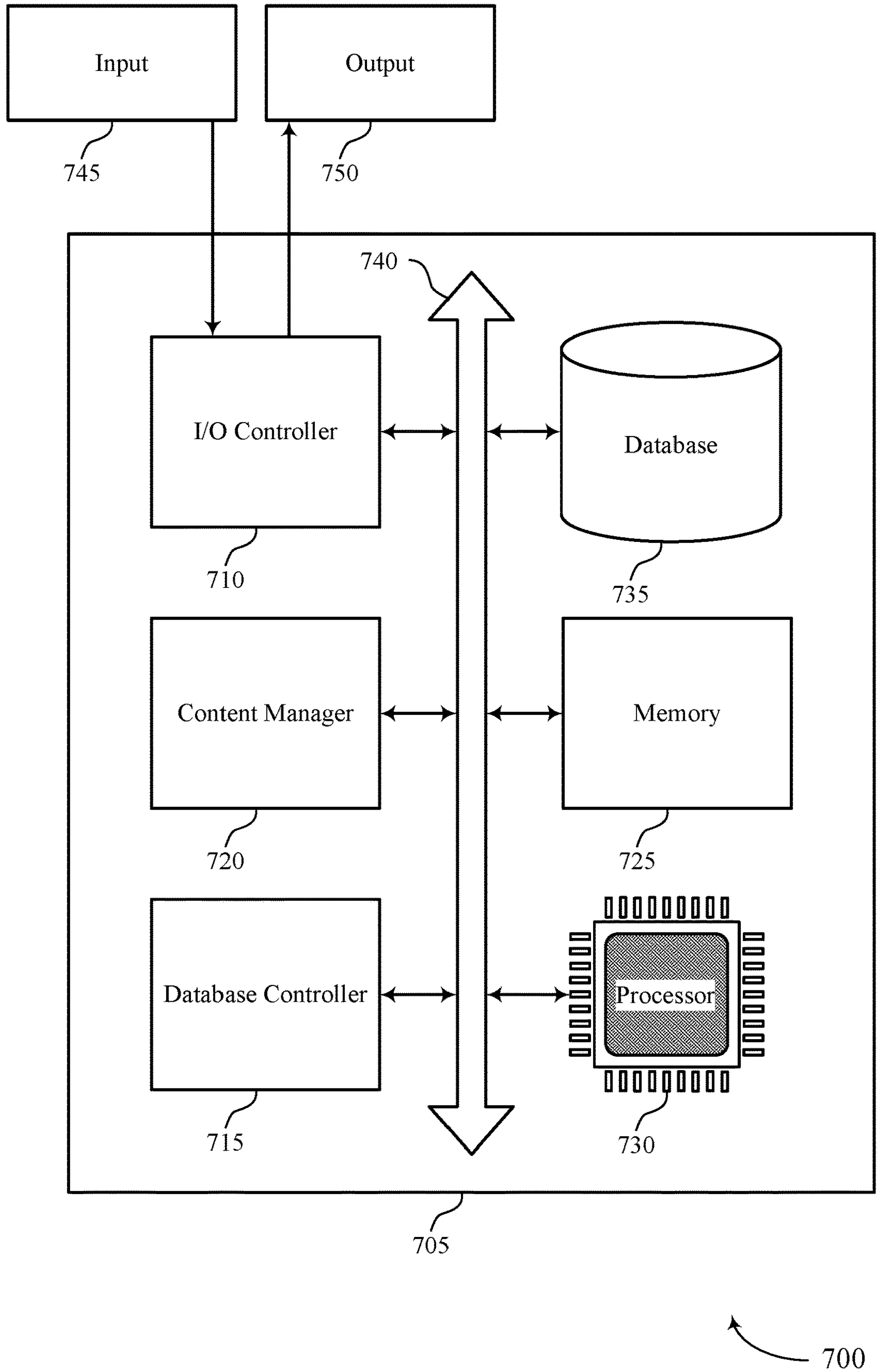
FIG. 7 shows a diagram of a system including a device that supports a trust layer for large language models in accordance with aspects of the present disclosure.

FIG. 7 shows a diagram of a system 700 including a device 705 that supports a trust layer for large language models in accordance with aspects of the present disclosure. The device 705 may be an example of or include the components of a device 505 as described herein. The device 705 may be an example of or represent aspects of one or more servers (e.g., computing servers) that implement a model interface as described herein. The device 705 may include components for providing or supporting various services including components for transmitting and receiving communications and components for interfacing with a machine learning model, such as a content manager 720, an I/O controller 710, a database controller 715, at least one memory 725, at least one processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause at least one processor 730 to perform various functions described herein. In some cases, the memory 725 may contain, among other things, a basic I/O system (BIOS) which may control basic hardware or software operation such as the interaction with peripheral components or devices. The memory 725 may be an example of a single memory or multiple memories. For example, the device 705 may include one or more memories 725.

The processor 730 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in at least one memory 725 to perform various functions (e.g., functions or tasks supporting a trust layer for large language models). The processor 730 may be an example of a single processor or multiple processors. For example, the device 705 may include one or more processors 730.

The content manager 720 may support data processing in accordance with examples as disclosed herein. For example, the content manager 720 may be configured for receiving, from a client and at an interface for accessing a large language model, a prompt for a response from the large language model, where the client is associated with a set of configuration parameters via a cloud platform that supports the interface. The content manager 720 may be configured for modifying, in accordance with the set of configuration parameters, the prompt that results in a modified prompt. The content manager 720 may be configured for transmitting, to the large language model via a model interface, the modified prompt. The content manager 720 may be configured for receiving, via the model interface, the response to the modified prompt, where the response is generated by the large language model. The content manager 720 may be configured to provide the response to a model that determines one or more probabilities that the response contains content from one or more content categories. The content manager 720 may be configured for transmitting, to the client and based on the one or more probabilities, the response, an indication of the one or more probabilities, or a combination thereof.

By including or configuring the content manager 720 in accordance with examples as described herein, the device 705 may support techniques for improving LLM accuracy, data security, privacy, and response content safety.

Figure 8:
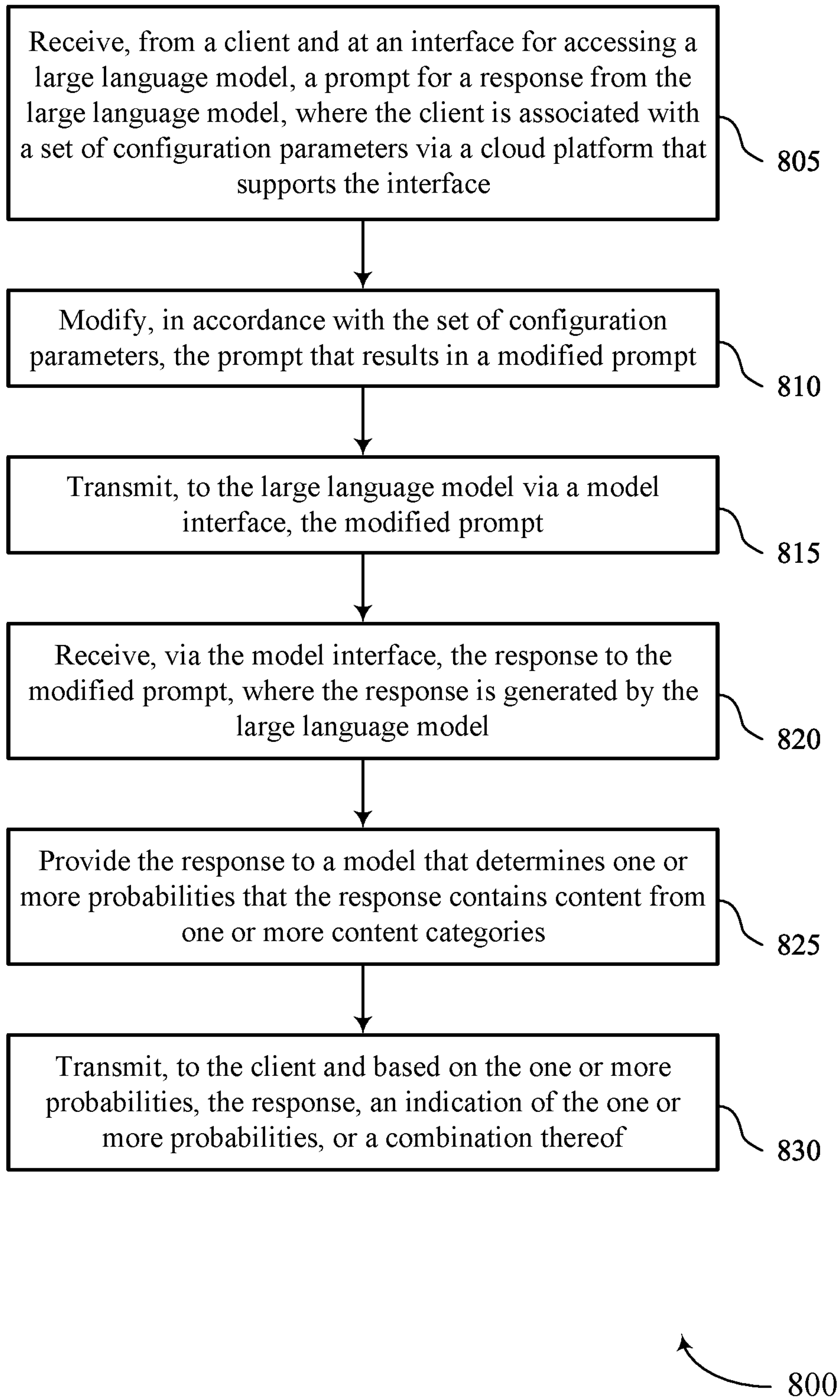
FIGS. 8 and 9 show flowcharts illustrating methods that support a trust layer for large language models in accordance with aspects of the present disclosure.

FIG. 8 shows a flowchart illustrating a method 800 that supports a trust layer for large language models in accordance with aspects of the present disclosure. The operations of the method 800 may be implemented by a server or its components as described herein. For example, the operations of the method 800 may be performed by a server as described with reference to FIGS. 1 through 7. In some examples, a server may execute a set of instructions to control the functional elements of the server to perform the described functions. Additionally, or alternatively, the server may perform aspects of the described functions using special-purpose hardware.

At 805, the method may include receiving, from a client and at an interface for accessing a large language model, a prompt for a response from the large language model, where the client is associated with a set of configuration parameters via a cloud platform that supports the interface. The operations of block 805 may be performed in accordance with examples as disclosed herein. In some examples, aspects of the operations of 805 may be performed by an input prompt interface 625 as described with reference to FIG. 6.

At 810, the method may include modifying, in accordance with the set of configuration parameters, the prompt that results in a modified prompt. The operations of block 810 may be performed in accordance with examples as disclosed herein. In some examples, aspects of the operations of 810 may be performed by a prompt modification component 630 as described with reference to FIG. 6.

At 815, the method may include transmitting, to the large language model via a model interface, the modified prompt. The operations of block 815 may be performed in accordance with examples as disclosed herein. In some examples, aspects of the operations of 815 may be performed by a prompt transmission component 635 as described with reference to FIG. 6.

At 820, the method may include receiving, via the model interface, the response to the modified prompt, where the response is generated by the large language model. The operations of block 820 may be performed in accordance with examples as disclosed herein. In some examples, aspects of the operations of 820 may be performed by a response component 640 as described with reference to FIG. 6.

At 825, the method may include providing the response to a model that determines one or more probabilities that the response contains content from one or more content categories. The operations of block 825 may be performed in accordance with examples as disclosed herein. In some examples, aspects of the operations of 825 may be performed by a content component 645 as described with reference to FIG. 6.

At 830, the method may include transmitting, to the client and based on the one or more probabilities, the response, an indication of the one or more probabilities, or a combination thereof. The operations of block 830 may be performed in accordance with examples as disclosed herein. In some examples, aspects of the operations of 830 may be performed by a response interface 650 as described with reference to FIG. 6.

Figure 9:
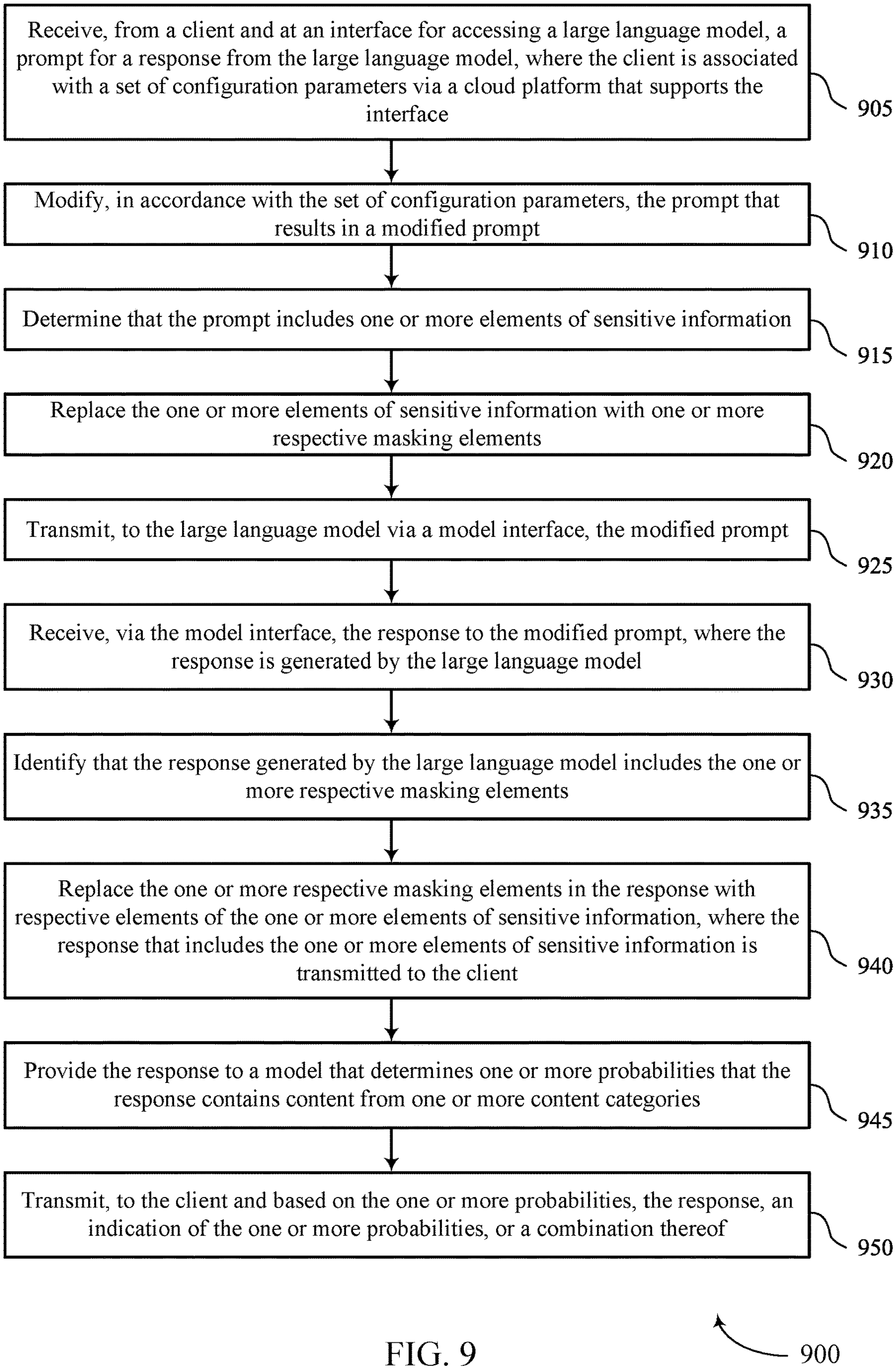

FIG. 9 shows a flowchart illustrating a method 900 that supports a trust layer for large language models in accordance with aspects of the present disclosure. The operations of the method 900 may be implemented by a server or its components as described herein. For example, the operations of the method 900 may be performed by a server as described with reference to FIGS. 1 through 7. In some examples, a server may execute a set of instructions to control the functional elements of the server to perform the described functions. Additionally, or alternatively, the server may perform aspects of the described functions using special-purpose hardware.

At 905, the method may include receiving, from a client and at an interface for accessing a large language model, a prompt for a response from the large language model, where the client is associated with a set of configuration parameters via a cloud platform that supports the interface. The operations of block 905 may be performed in accordance with examples as disclosed herein. In some examples, aspects of the operations of 905 may be performed by an input prompt interface 625 as described with reference to FIG. 6.

At 910, the method may include modifying, in accordance with the set of configuration parameters, the prompt that results in a modified prompt. The operations of block 910 may be performed in accordance with examples as disclosed herein. In some examples, aspects of the operations of 910 may be performed by a prompt modification component 630 as described with reference to FIG. 6.

At 915, the method may include determining that the prompt includes one or more elements of sensitive information. The operations of block 915 may be performed in accordance with examples as disclosed herein. In some examples, aspects of the operations of 915 may be performed by a masking component 655 as described with reference to FIG. 6.

At 920, the method may include replacing the one or more elements of sensitive information with one or more respective masking elements. The operations of block 920 may be performed in accordance with examples as disclosed herein. In some examples, aspects of the operations of 920 may be performed by a masking component 655 as described with reference to FIG. 6.

At 925, the method may include transmitting, to the large language model via a model interface, the modified prompt. The operations of block 925 may be performed in accordance with examples as disclosed herein. In some examples, aspects of the operations of 925 may be performed by a prompt transmission component 635 as described with reference to FIG. 6.

At 930, the method may include receiving, via the model interface, the response to the modified prompt, where the response is generated by the large language model. The operations of block 930 may be performed in accordance with examples as disclosed herein. In some examples, aspects of the operations of 930 may be performed by a response component 640 as described with reference to FIG. 6.

At 935, the method may include identifying that the response generated by the large language model includes the one or more respective masking elements. The operations of block 935 may be performed in accordance with examples as disclosed herein. In some examples, aspects of the operations of 935 may be performed by a de-masking component 680 as described with reference to FIG. 6.

At 940, the method may include replacing the one or more respective masking elements in the response with respective elements of the one or more elements of sensitive information, where the response that includes the one or more elements of sensitive information is transmitted to the client. The operations of block 940 may be performed in accordance with examples as disclosed herein. In some examples, aspects of the operations of 940 may be performed by a de-masking component 680 as described with reference to FIG. 6.

At 945, the method may include providing the response to a model that determines one or more probabilities that the response contains content from one or more content categories. The operations of block 945 may be performed in accordance with examples as disclosed herein. In some examples, aspects of the operations of 945 may be performed by a content component 645 as described with reference to FIG. 6.

At 950, the method may include transmitting, to the client and based on the one or more probabilities, the response, an indication of the one or more probabilities, or a combination thereof. The operations of block 950 may be performed in accordance with examples as disclosed herein. In some examples, aspects of the operations of 950 may be performed by a response interface 650 as described with reference to FIG. 6.

A method for data processing by an apparatus is described. The method may include receiving, from a client and at an interface for accessing a large language model, a prompt for a response from the large language model, where the client is associated with a set of configuration parameters via a cloud platform that supports the interface, modifying, in accordance with the set of configuration parameters, the prompt that results in a modified prompt, transmitting, to the large language model via a model interface, the modified prompt, receiving, via the model interface, the response to the modified prompt, where the response is generated by the large language model, providing the response to a model that determines one or more probabilities that the response contains content from one or more content categories, and transmitting, to the client and based on the one or more probabilities, the response, an indication of the one or more probabilities, or a combination thereof.

An apparatus for data processing is described. The apparatus may include one or more memories storing processor executable code, and one or more processors coupled with the one or more memories. The one or more processors may individually or collectively operable to execute the code to cause the apparatus to receive, from a client and at an interface for accessing a large language model, a prompt for a response from the large language model, where the client is associated with a set of configuration parameters via a cloud platform that supports the interface, modify, in accordance with the set of configuration parameters, the prompt that results in a modified prompt, transmit, to the large language model via a model interface, the modified prompt, receive, via the model interface, the response to the modified prompt, where the response is generated by the large language model, provide the response to a model that determines one or more probabilities that the response contains content from one or more content categories, and transmit, to the client and based on the one or more probabilities, the response, an indication of the one or more probabilities, or a combination thereof.

Another apparatus for data processing is described. The apparatus may include means for receiving, from a client and at an interface for accessing a large language model, a prompt for a response from the large language model, where the client is associated with a set of configuration parameters via a cloud platform that supports the interface, means for modifying, in accordance with the set of configuration parameters, the prompt that results in a modified prompt, means for transmitting, to the large language model via a model interface, the modified prompt, means for receiving, via the model interface, the response to the modified prompt, where the response is generated by the large language model, means for providing the response to a model that determines one or more probabilities that the response contains content from one or more content categories, and means for transmitting, to the client and based on the one or more probabilities, the response, an indication of the one or more probabilities, or a combination thereof.

A non-transitory computer-readable medium storing code for data processing is described. The code may include instructions executable by a processor to receive, from a client and at an interface for accessing a large language model, a prompt for a response from the large language model, where the client is associated with a set of configuration parameters via a cloud platform that supports the interface, modify, in accordance with the set of configuration parameters, the prompt that results in a modified prompt, transmit, to the large language model via a model interface, the modified prompt, receive, via the model interface, the response to the modified prompt, where the response is generated by the large language model, provide the response to a model that determines one or more probabilities that the response contains content from one or more content categories, and transmit, to the client and based on the one or more probabilities, the response, an indication of the one or more probabilities, or a combination thereof.

In some examples of the method, apparatus, and non-transitory computer-readable medium described herein, modifying the prompt may include operations, features, means, or instructions for determining that the prompt includes one or more elements of sensitive information and replacing the one or more elements of sensitive information with one or more respective masking elements.

Some examples of the method, apparatus, and non-transitory computer-readable medium described herein may further include operations, features, means, or instructions for identifying that the response generated by the large language model includes the one or more respective masking elements and replacing the one or more respective masking elements in the response with respective elements of the one or more elements of sensitive information, where the response that includes the one or more elements of sensitive information may be transmitted to the client.

In some examples of the method, apparatus, and non-transitory computer-readable medium described herein, the one or more elements of sensitive information include personally identifiable information (PII), payment card industry (PCI) information, protected health information (PHI), or a combination thereof.

In some examples of the method, apparatus, and non-transitory computer-readable medium described herein, the one or more elements of sensitive information include information that may be flagged to be masked in accordance with the set of configuration parameters.

In some examples of the method, apparatus, and non-transitory computer-readable medium described herein, modifying the prompt may include operations, features, means, or instructions for inserting a first set of characters prior to the prompt to generate the modified prompt, inserting a second set of characters after the prompt to generate the modified prompt, and inserting the first set of characters prior to the prompt and inserting the second set of characters after the prompt to generate the modified prompt.

In some examples of the method, apparatus, and non-transitory computer-readable medium described herein, the first set of characters, the second set of characters, or both include a random sequence of characters, a set of Extensible Markup Language (XML) tags, or a combination thereof.

In some examples of the method, apparatus, and non-transitory computer-readable medium described herein, modifying the prompt may include operations, features, means, or instructions for deleting one or more elements of the prompt to generate the modified prompt.

Some examples of the method, apparatus, and non-transitory computer-readable medium described herein may further include operations, features, means, or instructions for logging the one or more probabilities in association with the prompt, the response, or both.

Some examples of the method, apparatus, and non-transitory computer-readable medium described herein may further include operations, features, means, or instructions for determining whether the one or more probabilities satisfy a threshold, where the response, the indication of the one or more probabilities, or both may be transmitted to the client based on whether the one or more probabilities satisfy the threshold.

Some examples of the method, apparatus, and non-transitory computer-readable medium described herein may further include operations, features, means, or instructions for obtaining the threshold from the set of configuration parameters.

In some examples of the method, apparatus, and non-transitory computer-readable medium described herein, the one or more content categories include toxicity, hate, identity, violence, physical, sexual, profanity, or a combination thereof.

The following provides an overview of aspects of the present disclosure:

Aspect 1: A method for data processing, comprising: receiving, from a client and at an interface for accessing a large language model, a prompt for a response from the large language model, wherein the client is associated with a set of configuration parameters via a cloud platform that supports the interface: modifying, in accordance with the set of configuration parameters, the prompt that results in a modified prompt: transmitting, to the large language model via a model interface, the modified prompt: receiving, via the model interface, the response to the modified prompt, wherein the response is generated by the large language model: providing the response to a model that determines one or more probabilities that the response contains content from one or more content categories; and transmitting, to the client and based at least in part on the one or more probabilities, the response, an indication of the one or more probabilities, or a combination thereof.

Aspect 2: The method of aspect 1, wherein modifying the prompt comprises: determining that the prompt comprises one or more elements of sensitive information; and replacing the one or more elements of sensitive information with one or more respective masking elements.

Aspect 3: The method of aspect 2, further comprising: identifying that the response generated by the large language model comprises the one or more respective masking elements; and replacing the one or more respective masking elements in the response with respective elements of the one or more elements of sensitive information, wherein the response that comprises the one or more elements of sensitive information is transmitted to the client.

Aspect 4: The method of any of aspects 2 through 3, wherein the one or more elements of sensitive information comprise personally identifiable information (PII), payment card industry (PCI) information, protected health information (PHI), or a combination thereof.

Aspect 5: The method of any of aspects 2 through 4, wherein the one or more elements of sensitive information comprise information that is flagged to be masked in accordance with the set of configuration parameters.

Aspect 6: The method of any of aspects 1 through 5, wherein modifying the prompt comprises: inserting a first set of characters prior to the prompt to generate the modified prompt, or inserting a second set of characters after the prompt to generate the modified prompt, or inserting the first set of characters prior to the prompt and inserting the second set of characters after the prompt to generate the modified prompt.

Aspect 7: The method of aspect 6, wherein the first set of characters, the second set of characters, or both comprise a random sequence of characters, a set of Extensible Markup Language (XML) tags, or a combination thereof.

Aspect 8: The method of any of aspects 1 through 7, wherein modifying the prompt comprises: deleting one or more elements of the prompt to generate the modified prompt.

Aspect 9: The method of any of aspects 1 through 8, further comprising: logging the one or more probabilities in association with the prompt, the response, or both.

Aspect 10: The method of any of aspects 1 through 9, further comprising: determining whether the one or more probabilities satisfy a threshold, wherein the response, the indication of the one or more probabilities, or both are transmitted to the client based at least in part on whether the one or more probabilities satisfy the threshold.

Aspect 11: The method of aspect 10, further comprising: obtaining the threshold from the set of configuration parameters.

Aspect 12: The method of any of aspects 1 through 11, wherein the one or more content categories comprise toxicity, hate, identity, violence, physical, sexual, profanity, or a combination thereof.

Aspect 13: An apparatus for data processing, comprising one or more memories storing processor-executable code, and one or more processors coupled with the one or more memories and individually or collectively operable to execute the code to cause the apparatus to perform a method of any of aspects 1 through 12.

Aspect 14: An apparatus for data processing, comprising at least one means for performing a method of any of aspects 1 through 12.

Aspect 15: A non-transitory computer-readable medium storing code for data processing, the code comprising instructions executable by a processor to perform a method of any of aspects 1 through 12.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:

receiving, from a client and at an interface for accessing a large language model, a prompt for a response from the large language model, wherein the client is associated with a set of configuration parameters via a cloud platform that supports the interface;

modifying, in accordance with the set of configuration parameters, the prompt that results in a modified prompt;

transmitting, to the large language model via a model interface, the modified prompt;

receiving, via the model interface, the response to the modified prompt, wherein the response is generated by the large language model;

providing the response to a model that determines one or more probabilities that the response contains content from one or more content categories;

determining whether the one or more probabilities satisfy a threshold; and transmitting, to the client and based at least in part on determining whether the one or more probabilities satisfy the threshold, the response, an indication of the one or more probabilities, or a combination thereof.

2. The method of claim 1, wherein modifying the prompt comprises:

determining that the prompt comprises one or more elements of sensitive information; and replacing the one or more elements of sensitive information with one or more respective masking elements.

3. The method of claim 2, further comprising:

identifying that the response generated by the large language model comprises the one or more respective masking elements; and replacing the one or more respective masking elements in the response with respective elements of the one or more elements of sensitive information, wherein the response that comprises the one or more elements of sensitive information is transmitted to the client.

4. The method of claim 2, wherein the one or more elements of sensitive information comprise personally identifiable information (PII), payment card industry (PCI) information, protected health information (PHI), or a combination thereof.

5. The method of claim 2, wherein the one or more elements of sensitive information comprise information that is flagged to be masked in accordance with the set of configuration parameters.

6. The method of claim 1, wherein modifying the prompt comprises:

inserting a first set of characters prior to the prompt to generate the modified prompt, or inserting a second set of characters after the prompt to generate the modified prompt, or inserting the first set of characters prior to the prompt and inserting the second set of characters after the prompt to generate the modified prompt.

7. The method of claim 6, wherein the first set of characters, the second set of characters, or both comprise a random sequence of characters, a set of Extensible Markup Language (XML) tags, or a combination thereof.

8. The method of claim 1, wherein modifying the prompt comprises:

deleting one or more elements of the prompt to generate the modified prompt.

9. The method of claim 1, further comprising:

logging the one or more probabilities in association with the prompt, the response, or both.

10. The method of claim 1, further comprising:

obtaining the threshold from the set of configuration parameters.

11. The method of claim 1, wherein the one or more content categories comprise toxicity, hate, identity, violence, physical, sexual, profanity, or a combination thereof.

12. An apparatus for data processing, comprising:

one or more memories storing processor-executable code; and one or more processors coupled with the one or more memories and individually or collectively operable to execute the code to cause the apparatus to:

receive, from a client and at an interface for accessing a large language model, a prompt for a response from the large language model, wherein the client is associated with a set of configuration parameters via a cloud platform that supports the interface;

modify, in accordance with the set of configuration parameters, the prompt that results in a modified prompt;

transmit, to the large language model via a model interface, the modified prompt;

receive, via the model interface, the response to the modified prompt, wherein the response is generated by the large language model;

provide the response to a model that determines one or more probabilities that the response contains content from one or more content categories;

determine whether the one or more probabilities satisfy a threshold; and transmit, to the client and based at least in part on determining whether the one or more probabilities satisfy the threshold, the response, an indication of the one or more probabilities, or a combination thereof.

13. The apparatus of claim 12, wherein, to modify the prompt, the one or more processors are individually or collectively operable to execute the code to cause the apparatus to:

determine that the prompt comprises one or more elements of sensitive information; and replace the one or more elements of sensitive information with one or more respective masking elements.

14. The apparatus of claim 13, wherein the one or more processors are individually or collectively further operable to execute the code to cause the apparatus to:

identify that the response generated by the large language model comprises the one or more respective masking elements; and replace the one or more respective masking elements in the response with respective elements of the one or more elements of sensitive information, wherein the response that comprises the one or more elements of sensitive information is transmitted to the client.

15. The apparatus of claim 13, wherein the one or more elements of sensitive information comprise personally identifiable information (PII), payment card industry (PCI) information, protected health information (PHI), or a combination thereof.

16. A non-transitory computer-readable medium storing code for data processing, the code comprising instructions executable by one or more processors to:

receive, from a client and at an interface for accessing a large language model, a prompt for a response from the large language model, wherein the client is associated with a set of configuration parameters via a cloud platform that supports the interface;

modify, in accordance with the set of configuration parameters, the prompt that results in a modified prompt;

transmit, to the large language model via a model interface, the modified prompt;

receive, via the model interface, the response to the modified prompt, wherein the response is generated by the large language model;

provide the response to a model that determines one or more probabilities that the response contains content from one or more content categories;

determine whether the one or more probabilities satisfy a threshold; and transmit, to the client and based at least in part on determining whether the one or more probabilities satisfy the threshold, the response, an indication of the one or more probabilities, or a combination thereof.

17. The non-transitory computer-readable medium of claim 16, wherein the instructions to modify the prompt are executable by the one or more processors to:

determine that the prompt comprises one or more elements of sensitive information; and replace the one or more elements of sensitive information with one or more respective masking elements.

18. The non-transitory computer-readable medium of claim 17, wherein the instructions are further executable by the one or more processors to:

identify that the response generated by the large language model comprises the one or more respective masking elements; and replace the one or more respective masking elements in the response with respective elements of the one or more elements of sensitive information, wherein the response that comprises the one or more elements of sensitive information is transmitted to the client.

19. The non-transitory computer-readable medium of claim 17, wherein the one or more elements of sensitive information comprise personally identifiable information (PII), payment card industry (PCI) information, protected health information (PHI), or a combination thereof.

* * * * *